Figures 1, 2:
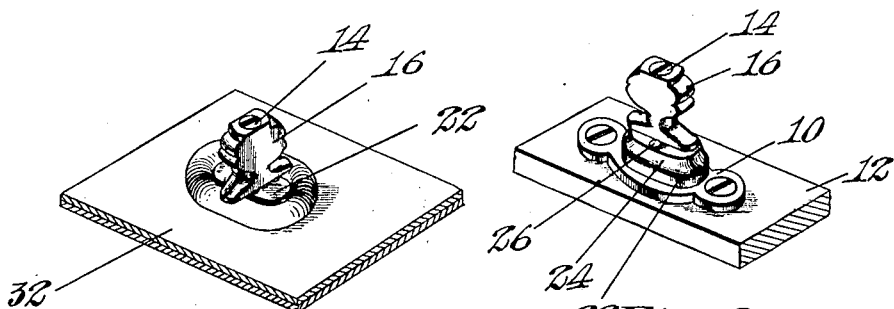

W. H. LEGGO.
FASTENING DEVICE.
APPLICATION FILED APR. 15, 1915.

1,206,866.

Patented Dec. 5, 1916.

INVENTOR

William H. Leggo.

UNITED STATES PATENT OFFICE.

WILLIAM H. LEGGO, OF ANSONIA, CONNECTICUT, ASSIGNOR TO THE S. O. & C. CO., OF ANSONIA, CONNECTICUT, A CORPORATION OF CONNECTICUT.

FASTENING DEVICE.

1,206,866.  Specification of Letters Patent.  Patented Dec. 5, 1916.

Application filed April 15, 1915. Serial No. 21,567.

*To all whom it may concern:*

Be it known that I, WILLIAM H. LEGGO, a citizen of the United States, residing at Ansonia, in the county of New Haven and State of Connecticut, have invented certain Improvements in Fastening Devices, of which the following description, in connection with the accompanying drawings, is a specification, like reference characters on the drawings indicating like parts in the several figures.

This invention relates to fastening devices such as are used for carriage curtains or automobile tops.

One object of the invention is to provide a fastening device constructed and arranged to engage a curtain in such manner as to eliminate the objectionable rattling which has been incident to the use of such devices as heretofore constructed.

A further object of the invention is to provide a fastening device of simple and reliable construction which shall be well suited to the hard service to which it is subjected.

An important feature of the invention consists in a rotatable locking head in combination with a coöperating curtain engaging member arranged for relative movement in a yielding manner. In the use of a fastening device so constructed the curtain, or the gromet which usually surrounds the opening in a curtain, is yieldingly engaged regardless of its thickness and held without rattling. As herein shown the relative yielding movement of the curtain engaging parts is also utilized to hold the two parts in their locking position.

Still another feature of the invention consists in a member having a tapering shoulder shaped to fit within the gromet for centering the gromet and preventing transverse movement thereof with respect to the parts of the fastener. This feature is important in eliminating rattling and also in maintaining the gromet in the proper position with respect to the fastener.

Other features of the invention relate to the structural characteristics of the fastening device. These will be best understood and appreciated from the following description of a preferred embodiment of the invention selected for purposes of illustration and shown in the accompanying drawings, in which,—

Figures 3, 4:
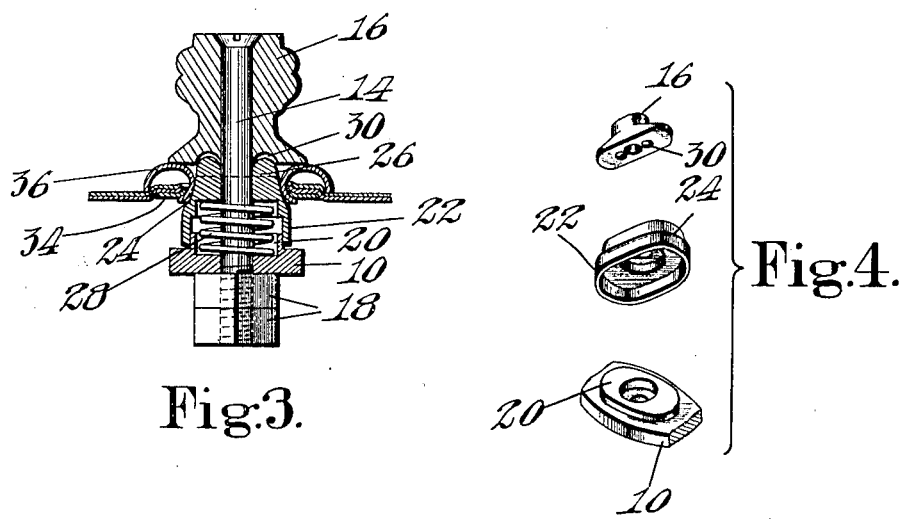

Figure 1 is a view in perspective of a fastening device embodying the invention together with a portion of a curtain held thereby; Fig. 2 is a perspective view of the fastening device in unlocked condition; Fig. 3 is a sectional view of the fastener and curtain as shown in Fig. 1, and Fig. 4 is a view showing various parts of the fastening device in detail.

The fastening device as herein shown comprises a base portion 10 adapted to be secured by screws or otherwise to a portion 12 of the vehicle. The base 10 comprises a plate perforated to receive a screw 14 which carries the rotatable locking head 16. The head 16 is soldered or otherwise rigidly secured to the upper end of the screw 14 and the screw is provided at its lower end with a pair of locking nuts 18. The base 10 is provided with an upwardly projecting flange 20 of generally oval contour. Surrounding the flange 20 and guided thereby for limited vertical movement is a sleeve 22 having an upwardly disposed engaging shoulder 24 and locking projections 26 upon its upper surface. The base 10 and the under side of the sleeve 22 are provided with sockets between which is received a compression spring 28 tending normally to urge the sleeve 22 upwardly. The head 16 is provided in its lower face with a pair of locking recesses 30 shaped to receive the projections 26 upon the upper end of the sleeve so that the head will be held yieldingly in locking position when turned for this purpose.

The curtain 32 is perforated so that it may be passed over the locking head 16 and ordinarily there is provided a washer 34 on one side of the curtain and a gromet 36 disposed with its flange on the other side of the curtain and with its barrel passing through the hole and clenched upon the washer.

From the foregoing description the character and operation of the illustrated fastening device will be clear. In fastening a curtain in place the locking head 16 is turned to bring its major axis into a position parallel with the major axis of the recess or gromet in the curtain. The gromet is then passed over the locking head and the locking head is given a quarter turn thus bringing its major axis at right angles to that of the gromet. In this operation the lower face of the locking head 16 engages the curved surface of the gromet and depresses the gromet against the shoulder 24 of the sleeve 22 whereby it is centered, the sleeve itself being somewhat depressed against the spring 28. The turning movement of the locking head also depresses the sleeve 22 sufficiently to permit the locking projections 26 to enter the recesses 30 in the head whereby the locking head is yieldingly maintained in the position shown in Fig. 1. It will be seen that the gromet 36 is engaged yieldingly between the lower surface of the locking head 16 and the shoulder 24 of the sleeve 22, the gromet thus being prevented from rattling back and forth between these engaging surfaces, or in a direction at right angles thereto. The spring 28 not only has the function of exerting a yielding pressure upon the gromet but also yieldingly maintains the locking projections 26 in the coöperating recesses 30.

Having thus described my invention I claim as new and desire to secure by Letters Patent:

1. A fastening device having, in combination, a rotatable locking head shaped to be passed through an oval gromet, a sleeve having a tapering shoulder shaped to center the gromet, and means for yieldingly pressing the sleeve toward the head.

2. A fastening device having, in combination, a locking head shaped to receive an oval gromet, and a member disposed beneath the head and arranged to be pressed yieldingly toward the head, said member having means for centering the gromet and holding it against the head.

3. A fastening device, having, in combination, means for yieldingly supporting an oval gromet, a rotatable head shaped to be passed through the gromet and to depress the gromet when turned into a position at right angles to the major axis of the gromet, and means for temporarily maintaining the head in such position.

4. A fastening device, having, in combination, a stationary base, a rotatable stud mounted therein and having a locking head with sockets formed in its lower face, a sleeve having a curtain engaging surface and retaining projections shaped to fit the sockets in the locking head, and a spring for pressing the sleeve yieldingly toward the locking head, whereby the retaining projections are entered in the sockets in the head and the curtain is held under yielding pressure.

In testimony whereof I have signed my name to this specification.

WILLIAM H. LEGGO.